United States Patent
Diep

(10) Patent No.: US 6,370,648 B1
(45) Date of Patent: Apr. 9, 2002

(54) COMPUTER NETWORK INTRUSION DETECTION

(75) Inventor: Thanh A. Diep, Los Altos, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/208,617

(22) Filed: Dec. 8, 1998

(51) Int. Cl.$^7$ ............................. G06F 11/00; G06F 15/18
(52) U.S. Cl. ..................... 713/201; 713/200; 706/13; 706/14
(58) Field of Search .................. 713/201, 200; 706/13, 14

(56) References Cited

U.S. PATENT DOCUMENTS 5,983,251 A * 11/1999 Martens et al. ............. 708/203
6,272,479 B1 * 8/2001 Farry et al. .................... 706/13

OTHER PUBLICATIONS

R. Sekar et al, High Performance network intrusion detection system, 6$^{th}$ ACM Conference on Computers & Conms Security New York, NY, p. 8–17, Nov. 1999.*

Coit, C.J. et al., Towards faster string matching for intrusion detection or exceeding the speed of SNORT, Proceedings DARPA Info. Surviv. Conf: & Exposition II, Los Alamitos, CA. p. 367–73, Jun. 12, 2001.*

Sandeep Kumar and Eugene H. Spafford, "An Application of Pattern Matching in Intrusion Detection", Technical Report CSD–TR–94–013, Jun. 17, 1994, pp. 1–55, Department of Computer Sciences, Purdue University.

Aurobindo Sundaram, "An Introduction to Intrusion Detection", website, www.techmanager.com, Nov. 1996, pp. 1–13.

Lawrence Livermore National Laboratory, "National Info–Sec Technical Baseline Intrusion Detection and Response" Oct. 1996.

Phillip A. Porras and Peter G. Neumann, "EMERALD: Event Monitoring Enabling Responses to Anomalous Live Disturbances", Paper submission to the 20$^{th}$ National Information Systems Security Conference, pp. 1–16.

SRI International, "History of Intrusion Detection at SRI/CSL" Computer Science Laboratory, SRI International, Menlo Park, California, website, www.CSL.sir.com, pp. 1–4.

* cited by examiner

Primary Examiner—Norman M. Wright
(74) Attorney, Agent, or Firm—Beyer Weaver & Thomas, LLP

(57) ABSTRACT

Detecting harmful or illegal intrusions into a computer network or into restricted portions of a computer network uses statistical analysis to match user commands and program names with a template sequence. Discrete correlation matching and permutation matching are used to match sequences. The result of the match is input to a feature builder and then a modeler to produce a score. The score indicates possible intrusion. A sequence of user commands and program names and a template sequence of known harmful commands and program names from a set of such templates are retrieved. A closeness factor indicative of the similarity between the user command sequence and a template sequence is derived from comparing the two sequences. The user command sequence is compared to each template sequence in the set of templates thereby creating multiple closeness or similarity measurements. These measurements are examined to determine which sequence template is most similar to the user command sequence. A frequency feature associated with the user command sequence and the most similar template sequence is calculated. It is determined whether the user command sequence is a potential intrusion into restricted portions of the computer network by examining output from a modeler using the frequency feature as one input.

30 Claims, 7 Drawing Sheets

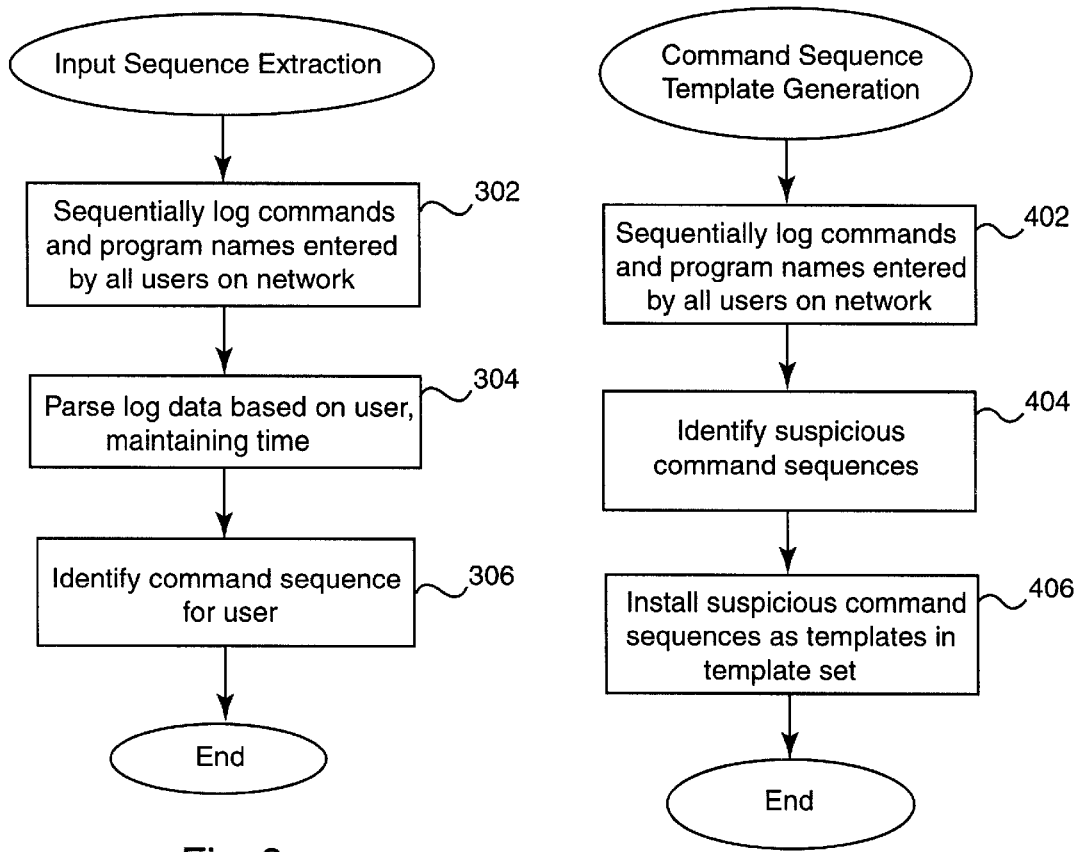
Fig. 3
Fig. 4A
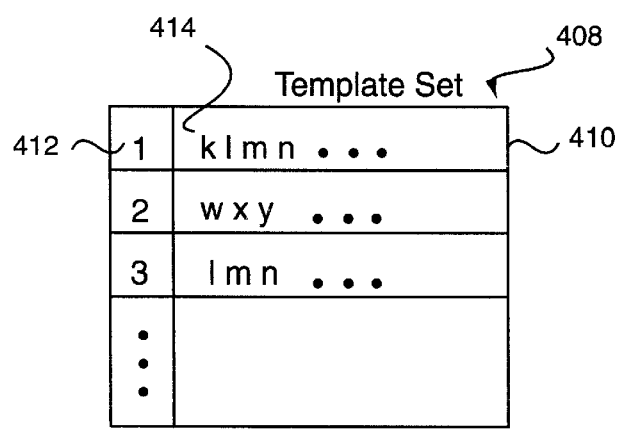
Fig. 4B

COMPUTER NETWORK INTRUSION DETECTION

BACKGROUND OF THE INVENTION

1. Field of the Invention

The present invention relates generally to the field of computer systems software and computer network security. More specifically, it relates to software for detecting intrusions and security violations in a computer system using statistical pattern analysis techniques.

2. Discussion of Related Art

Computer network security has been an important issue for all types of organizations and corporations for many years. Computer break-ins and their misuse have become common features. The number, as well as sophistication, of attacks on computer systems is on the rise. Often, network intruders have easily overcome the password authentication mechanism designed to protect the system. With an increased understanding of how systems work, intruders have become skilled at determining their weaknesses and exploiting them to obtain unauthorized privileges. Intruders also use patterns of intrusion that are often difficult to trace and identify. They use several levels of indirection before breaking into target systems and rarely indulge in sudden bursts of suspicious or anomalous activity. If an account on a target system is compromised, intruders may carefully cover their tracks as not to arouse suspicion. Furthermore, threats like viruses and worms do not need human supervision and are capable of replicating and traveling to connected computer systems. Unleashed at one computer, by the time they are discovered, it is almost impossible to trace their origin or the extent of infection.

As the number of users within a particular entity grows, the risks from unauthorized intrusions into computer systems or into certain sensitive components of a large computer system increase. In order to maintain a reliable and secure computer network, regardless of network size, exposure to potential network intrusions must be reduced as much as possible. Network intrusions can originate from legitimate users within an entity attempting to access secure portions of the network or can originate from "hackers" or illegitimate users outside an entity attempting to break into the entity's network. Intrusions from either of these two groups of users can be damaging to an organization's computer network.

One approach to detecting computer network intrusions is analyzing command sequences input by users or intruders in a computer system. The goal is to determine when a possible intrusion is occurring and who the intruder is. This approach is referred to broadly as intrusion detection using pattern matching. Sequences of commands (typically operating system or non-application specific commands) and program or file names entered by each user are compared to anomalous command patterns derived through historical and other empirical data. By performing this matching or comparing, security programs can generally detect anomalous command sequences that can lead to detection of a possible intrusion.

FIG. 1 is a block diagram of a security system of a computer network as is presently known in the art. A network security system 10 is shown having four general components: an input sequence 12; a set of templates of suspect command sequences 14; a match component 16; and an output score 18. Input sequence 12 is a list of commands and program names entered in a computer system (not shown) in a particular order over a specific duration of time. The commands entered by a user that are typically external to a specific user application (e.g., a word processing program or database program) can be broadly classified as operating system level commands. The duration of time during which an input sequence is monitored can vary widely depending on the size of the network and the volume of traffic. Typical durations can be from 15 minutes to eight hours.

Template set 14 is a group of particular command sequences determined to be anomalous or suspicious for the given computer system. These suspect command sequences are typically determined empirically by network security specialists for the particular computer network within an organization or company. They are sequences of commands and program names that have proved in the past to be harmful to the network or are in some way indicative of a potential network intrusion. Thus, each command sequence is a template for an anomalous or harmful command sequence. Input sequence 12 and a command sequence template from template set 14 are routed to match component 16.

Component 16 typically uses some type of metric, for example a neural network, to perform a comparison between the input sequence and the next selected command sequence template. Once the match is performed between the two sequences, score 18 is output reflecting the closeness of the input sequence to the selected command sequence template. For example, a low score could indicate that the input sequence is not close to the template and a high score could indicate that the two are very similar or close. Thus, by examining score 18, computer security system 10 can determine whether an input sequence from a network user or hacker is a potential intrusion because the input sequence closely resembles a known anomalous command sequence.

Many computer network security systems presently in use and as shown in FIG. 1 have some significant drawbacks. One is often an overly complicated and inefficient matching metric or technique used to compare the two command sequences. The definition of "closeness" with these metrics is typically complicated and difficult to implement. Another drawback is also related to the matching metric used in matching component 16. Typically, matching metrics presently employed for intrusion detection in network security systems end their analysis after focusing only on the command sequences themselves. They do not take into account other information that may be available to define the closeness or similarity of the command sequences, which might lead to a better analysis.

Tools are therefore necessary to monitor systems, to detect break-ins, and to respond actively to the attack in real time. Most break-ins prevalent today exploit well known security holes in system software. One solution to these problems is to study the characteristics of intrusions and from these, to extrapolate intrusion characteristics of the future, devise means of representing intrusions in a computer so that the break-ins can be detected in real time.

Therefore, it would be desirable to use command sequence pattern matching for detecting network intrusion that has matching metrics that are efficient and simple to maintain and understand. It would be desirable if such matching metrics took advantage of relevant and useful information external to the immediate command sequence being analyzed, such as statistical data illustrative of the relationship between the command sequence and other users on the network. It would also be beneficial if such metrics provided a definition of closeness between two command sequences that is easy to interpret and manipulate by a network intrusion program.

SUMMARY OF THE INVENTION

To achieve the foregoing, methods, apparatus, and computer-readable medium are disclosed which provide computer network intrusion detection. In one aspect of the invention, a method of detecting an intrusion in a computer network is disclosed. A sequence of user commands and program names and a template sequence of known harmful commands and program names from a set of such templates are retrieved. A closeness factor indicative of the similarity between the user command sequence and the template sequence is derived from comparing the two sequences. The user command sequence is compared to each template sequence in the set of templates thereby creating multiple closeness factors. The closeness factors are examined to determine which sequence template is most similar to the user command sequence. A frequency feature associated with the user command sequence and the most similar template sequence is calculated. It is then determined whether the user command sequence is a potential intrusion into restricted portions of the computer network by examining output from a modeler using the frequency feature as one input. Advantageously, network intrusions can be detected using matching metrics that are efficient and simple to maintain and understand.

In one embodiment, the user command sequence is obtained by chronologically logging commands and program names entered in the computer network thereby creating a command log, and then arranging the command log according to individual users on the computer network. The user command sequence is identified from the command log using a predetermined time period. In another embodiment, the frequency of the user command sequence occurring in a command stream created by a network user from a general population of network users is determined. Another frequency value of how often the most similar sequence template occurs in a command stream created by all network users in the general population of network users is determined. The two frequency values are used to calculate a frequency feature.

In another aspect of the present invention, a method of matching two command sequences in a network intrusion detection system is described. A user sequence having multiple user commands is retrieved, along with a template sequence having multiple template commands. The shorter of the two sequences is transformed to match the length of the longer sequence using unique, reserved characters. A similarity factor is derived from the number of matches between the user commands and the template commands by performing a series of comparisons between the user sequence and the template sequence. Similarity factors between the user sequence and each one of the template sequences are stored. The similarity between the user sequence and each one of the template sequences is determined by examining the similarity factors, thereby reducing the complexity of the matching component of the computer network intrusion system. Advantageously, this method performs better than the prior art it is less complex and easier to maintain. In one embodiment, the similarity factor is derived by shifting either the user commands in the user sequence or the template commands in the template sequence before performing each comparison.

In another aspect of the invention, another method of matching two command sequences in a network intrusion detection system is described. A user sequence having multiple user commands is retrieved, along with a template sequence having multiple template commands. A user substring and a template substring are created. The user substring has user commands found in the template sequence and the template substring has stored commands found in the user sequence. The number of alterations needed to reorder either the user substring or the template substring to have the same order as one another is saved. The number of alterations needed to make the two substrings the same is indicative of the similarity between the user sequence and each one of the template sequences from the set of template sequences.

In one embodiment, an alteration is an inversion in which adjacent user commands or template commands are inverted until the order of commands in the two substrings are the same. In another embodiment, the number of alterations is normalized by dividing the number of alterations by the number of alterations that would be needed to make the two substrings the same if the commands in the substrings were in complete opposite order.

In another aspect of the invention, a system for detecting an intrusion in a computer network is described. An input sequence extractor retrieves a user input sequence, and a sequence template extractor retrieves a sequence template from a template set. A match component compares the user input sequence and the sequence template to derive a closeness factor. The closeness factor indicates a degree of similarity between the user input sequence and the sequence template. A features builder calculates a frequency feature associated with the user input sequence and a sequence template most similar to the user input sequence. A modeler uses the frequency feature as one input and output from the modeler can be examined to determine whether the user input sequence is a potential intrusion.

In one embodiment of the invention, the user input extractor has a command log containing commands and program names entered in the computer network and arranged chronologically and according to individual users on the computer network. The user input extractor also contains a sequence identifier that identifies the user input sequence from the command log using a given time period. In another embodiment of the invention, the sequence template extractor also has a command log that contains, in a chronological manner, commands and program names entered in the computer network. The extractor also has a command sequence identifier for identifying a command sequence determined to be suspicious from the command log, and a sequence template extractor that creates the sequence template from the command sequence. In yet another embodiment, the match component has a permutation matching component that compares the user input sequence and a sequence template from the sequence template set. In yet another embodiment, the match component has a correlation matching component that compares the user input sequence template and a sequence template from the sequence template set.

BRIEF DESCRIPTION OF THE DRAWINGS

The invention may be best understood by reference to the following description taken in conjunction with the accompanying drawings in which:

FIG. 3 is a flow diagram showing the extraction of an input sequence in accordance with the described embodiment.

FIG. 4A is a flow diagram showing a process for creating and installing templates of anomalous command sequences in accordance with the described embodiment.

FIG. 4B is a block diagram showing a series of command sequence templates and the format of a typical command sequence.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for comparing command sequences for use in a computer network intrusion detection program is described in the various figures. The metrics or methods used in the present invention for comparing command sequences utilize statistical data relating to a command sequence and computer network users to provide better analysis. In addition, the metrics are significantly less complex and more efficient than other metrics used for the same purpose, namely computer network security.

Intrusion Detection

Figure 1:
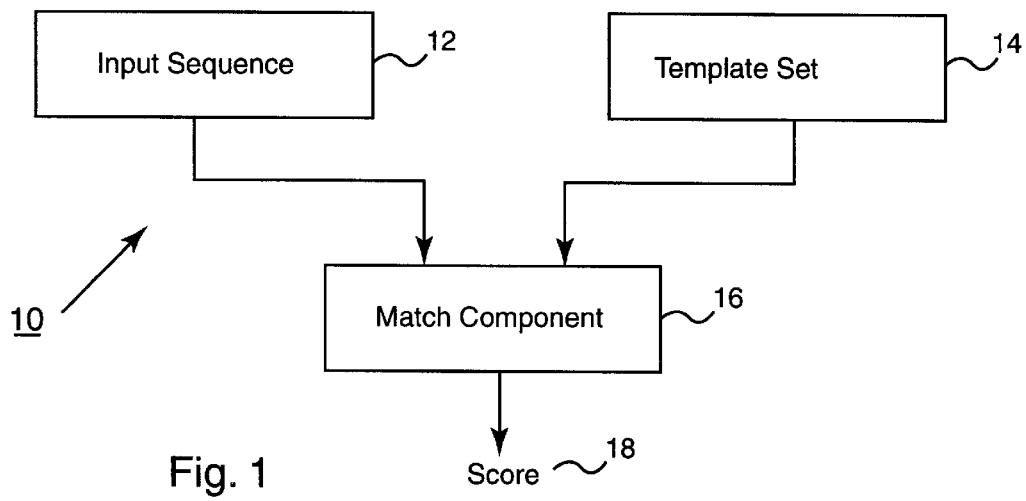
FIG. 1 is a block diagram of a security system of a computer network as is presently known in the art.
Figure 2:
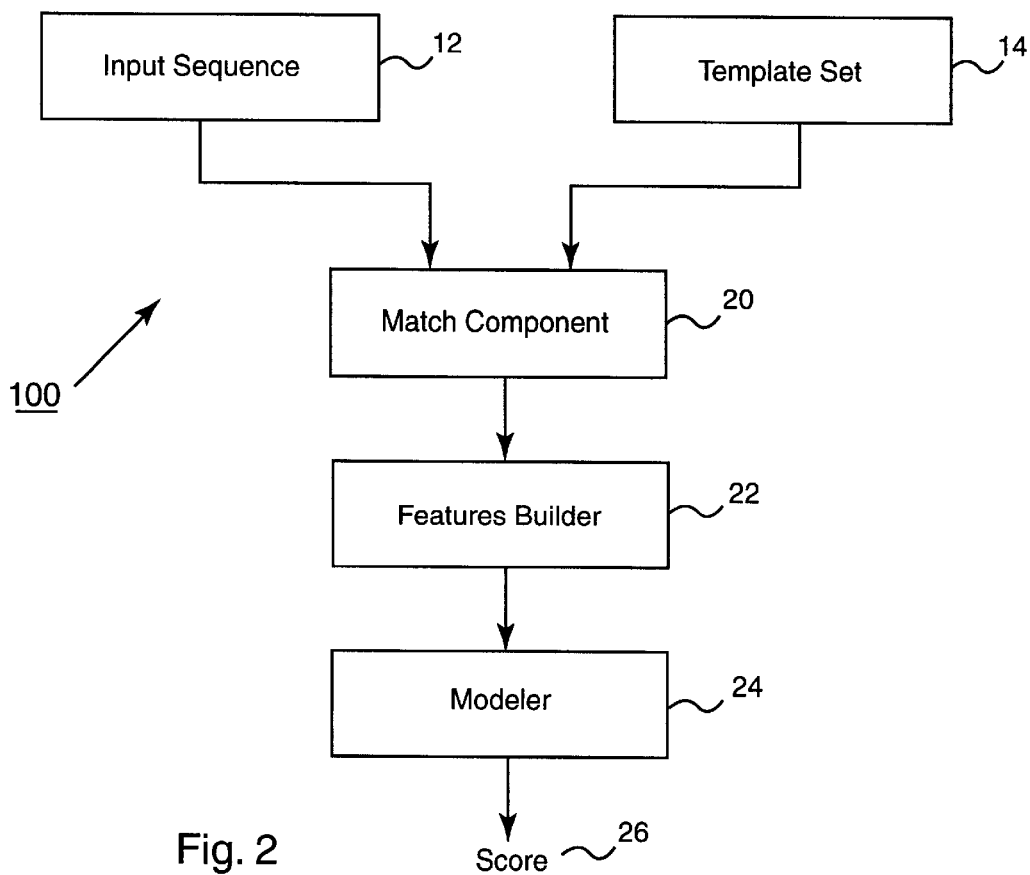
FIG. 2 is a block diagram of a computer network security system in accordance with the described embodiment of the present invention.

FIG. 2 is a block diagram of a computer network security system 100 in accordance with the described embodiment of the present invention. Network security system 100 may have components generally similar to those found in system 10 of FIG. 1. Similar components may include input sequence 12 and template set 14. Network security system 100 also has a match component 20, a features builder 22, and a modeler 24. In the described embodiment of the present invention, match component 20 uses a matching technique such as the two matching techniques described in greater detail in FIGS. 5, 8, and 9. These matching techniques compare a command sequence segment received from a user over a specific duration of time to a template command sequence from template set 14. The generation and format of command sequence templates is described in greater detail in FIGS. 4A and 4B. In a specific embodiment of the present invention, features builder 22 takes as input a particular command sequence template determined to be most similar to a user input sequence and calculates a frequency feature, among other features, for use by modeler 24. A description of features, as the term is used in the present invention, and a method of building such features are provided in FIG. 6. In one embodiment of the present invention, the computer system of FIG. 10 may be used to implement any or all of the processes of FIGS. 3, 4A, and 5 through 9.

FIG. 3 is a flow diagram showing the extraction of an input sequence in accordance with one embodiment of the present invention. FIG. 3 depicts one technique for obtaining input sequence 12 from the commands and program names entered by all network users. At step 302 a designated component of a computer network (such as a network server or a specially designated client computer) sequentially logs commands and program names entered by users logged onto the network. In a typical computer network, commands entered by users are logged chronologically. As they are entered into the log, each command is time stamped and can be identified by user names or identifiers. In another preferred embodiment, commands and program names can be logged based on criteria other than time. For example, commands can be arranged in the log according to user name or identifier or according to classes or types of commands. Examples of commands logged by the network are "DIR" "COPY" "DELETE" or "PRINT," etc. Examples of program names are Matlab, SAS, and MATHEMATICA.

At step 304 data in the log file is parsed according to user name or identifier while the time sequence is maintained. Thus, in the described embodiment, individual sub-logs are created for each user which contains all the commands and program names entered by the user in the same chronological order in which they were logged at step 302. In another preferred embodiment, this parsing may not be necessary if, for example, the commands and program names were initially logged and sorted. At step 306 a particular command sequence is identified for one or more users. The sequence length, which can range typically from 15 minutes to eight hours (or any other suitable time length), depends on specific characteristics of the network, such as the number and type of users, traffic volume, and other security considerations. Thus, in the described embodiment, steps 302 to 306 may be run as often as necessary to obtain meaningful and practical command sequences from users. It can also run for one user if that user is singled out for any reason or for all network users to maintain a constant watch over network activity.

FIG. 4A is a flow diagram showing a process for creating and installing templates of anomalous command sequences in accordance with one embodiment of the present invention. As used herein, command sequence includes both commands and program names. It shows in greater detail a process for providing template set 14 of FIGS. 1 and 2. As described above, template set 14 is a set of known command sequences that are determined to be anomalous or in some manner suspect. In another preferred embodiment, the command sequences in the set of templates 14 can also be indicative of other actions by users that for some reason is of interest to a network administrator. That is, the sequences can be normal or non-suspect, but still be of interest to a network security system.

At step 402 the system logs command and program names entered by users. In the described embodiment, step 402 may be performed as in step 302. Typically, the commands are logged over a long period, such as months or years. At step 404, security system experts and network security designers identify suspicious or anomalous command sequences. These identified command sequences are the command sequence templates in component 14. The sequences can be derived using historical or empirical data observed and collected by security experts for a particular computer network as is known in the art. The length of suspicious command sequences can vary. Thus, set of templates 14 can contain templates of varying length. At step 406 the identified sequences are installed as templates in component 14 as part of the network's intrusion detection system 100. Through the process of FIG. 4A, a set of templates is created and can be added to whenever a newly identified suspicious command sequence is discovered. The process of generating templates of command sequences is then complete.

Related to FIG. 4A, FIG. 4B shows a series of command sequence templates and the format of a typical command sequence. A set of templates 408 includes multiple numbered templates, an example of which is shown at row 410. Following the template number or other unique identifier 412, is a sequence of commands and program names 414. In this example, each of the letters k, l, m, and n represents a particular command and program name. In the described embodiment, the order of the commands as they appear in the template reflects the order in which they should be entered by a user to be considered close or similar. A user can enter other commands between the commands shown in the template without negating the closeness of the user's input sequence to a particular command sequence template. The number of templates in a set of templates depends on network specific factors and the level of intrusion detection (or other type of detection) desired by the network administrator. In another preferred embodiment, the format of template set 408 can emphasize other criteria. For example, the more important templates or most commonly detected sequences can appear first or "higher up" in the template set, or the templates can be sorted based on the length of the command sequence template.

Figure 5:
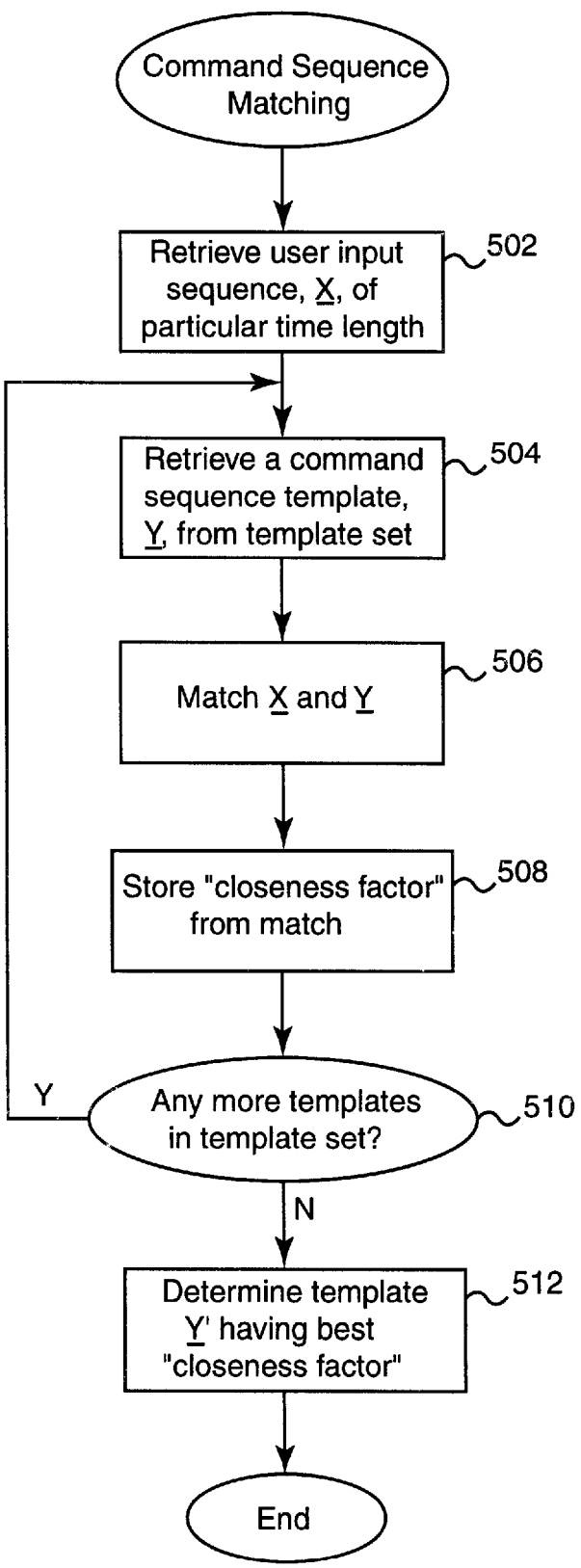
FIG. 5 is a flow diagram of a process for matching or comparing command sequences in accordance with the described embodiment of the present invention.

FIG. 5 is a flow diagram of a process for matching or comparing command sequences in accordance with the described embodiment of the present invention. It depicts a process implemented by match component 20 in FIG. 2. At step 502 the network security program retrieves an input command sequence input by a user in close to real time. Such a command sequence may be created as shown in FIG. 3. For the purpose of illustrating the described embodiment, an input command sequence of any particular length is represented by the variable X and is comprised of discrete commands or program names. As described above, the length of X depends on network specifications and security needs and thus can vary.

At step 504 the network security program retrieves one command sequence template, represented by Y, from template set 14. As described in FIGS. 4A and 4B, Y can be a sequence of commands that has been determined to be suspicious or anomalous and is comprised of discrete commands and program names. The length of Y also varies and does not have to be the same as X. In the described embodiment, the first time a sequence X is analyzed, the program selects the first template from template set 14, and retrieves the next template in the second iteration, as described below in step 510. In another preferred embodiment, the order of template Y selection can be based on other criteria such as frequency, importance, or length.

At step 506 input sequence X and template Y are matched or compared. Any suitable matching metric may be used. In the described embodiment, the network security program uses discrete correlation or permutation matching as matching metrics described in FIGS. 8 and 9 respectively. Other related techniques that use statistical analysis are bayesian networks and abnormality statistics. Both metrics output a "closeness factor" or other variable indicating how similar the input sequence X is to the currently selected template Y. This closeness factor or score from the match is stored in memory by the security program at step 508. The program then checks whether there are any more templates in template set 14 at step 510. If there are, the program retrieves the next template at step 504, and the match and store steps 506 and 508 are repeated. If there are no more templates, at step 512 the network security program determines which template Y' is most similar to input sequence X by examining the closeness factors or scores stored at step 508. At this point the matching process is complete. In the described embodiment, the matching process of FIG. 5 can be done multiple times for the same user or for multiple users throughout a predetermined time period, such as a day.

Figures 6, 7:
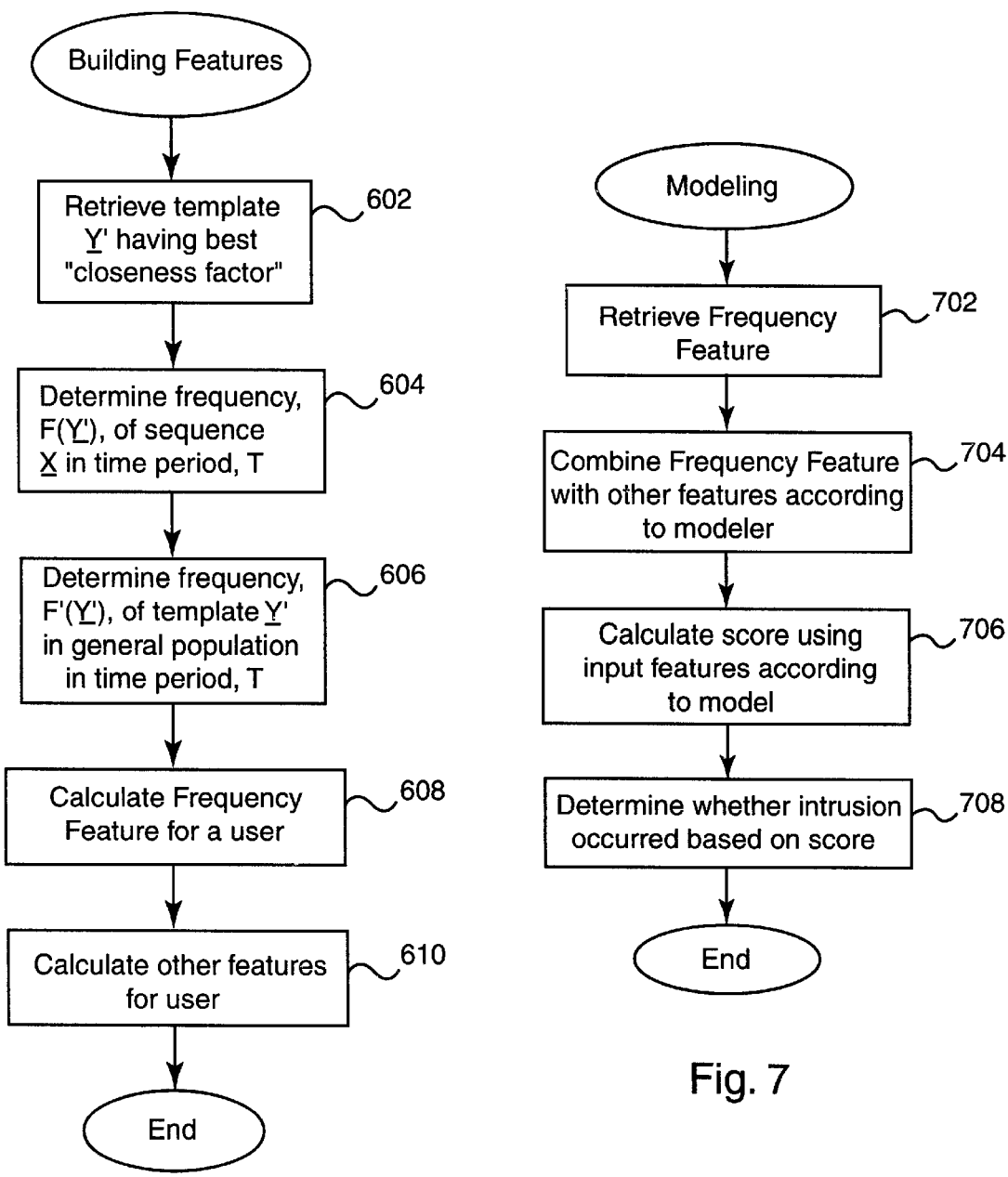
FIG. 6 is a flow diagram of a process for building features for use in a network intrusion program in accordance with the described embodiment of the present invention.
FIG. 7 is a flow diagram of a modeling process in accordance with the described embodiment of the present invention.

FIG. 6 is a flow diagram of a process for building features for use in a network intrusion program in accordance with the described embodiment of the present invention. FIG. 6 depicts a process implemented by feature builder 22 of FIG. 2. The input needed to begin building features, for example a frequency feature, is the template Y' determined to be the most similar to the input sequence X being analyzed as shown in FIG. 5. Template Y' is retrieved at step 602. Examples of other features are the number of audit records processed for a user in one minute; the relative distribution of file accesses, input/output activity over the entire system usage; and the amount of CPU and input/output activity from a user.

At step 604 the program determines a frequency, $f(Y')$, of user input sequence X within a predetermined time period T. The program calculates how often the input sequence X, whose closest template is Y' appears amongst all sequences entered by the same user during time period T. Preferably, the duration of time period T used in this step is greater than the sequence length of the input sequence from step 306. Thus, if the user input sequence contains commands and program names entered by a user over 30 minutes, time period T is preferably longer than 30 minutes.

At step 606 the program determines how often Y' appears amongst input sequences from the general population, such as all users on the network or some subset of those users. How often Y' occurs amongst input sequences from the general population can be determined by keeping a real-time log or record of all sequences of activity by all users in one long string without regard to what activity was performed by which users. It can then be determined how often Y' appears in that long string or real-time log. In another embodiment, an average of all the individual averages of each user is taken to determine how often Y' occurs amongst input sequences from the general population. Each user has an average number of occurrences Y' is entered by the user in time period T. At step 606, this frequency of occurrence, $f(Y')$, is determined over time period T. This frequency is used to convey how often other users of the network have entered input sequences that are the same as or highly similar to Y'.

At step 608, a frequency feature is calculated for the user based on F(Y') and F'(Y'). In the described embodiment, the frequency feature can be in the form of a real number and is, in one respect, a running average. This allows the program to calculate an average occurrence or frequency level dynamically without having to store and retrieve from memory the multiple values that would be needed to calculate a static average. A frequency feature is calculated using the variable F(Y') described above in addition to three other variables: $F'_{new}(Y')$, $F'_{old}(Y')$, and a. In the described embodiment, before the frequency feature is determined, $F'_{new}(Y')$ is calculated using the following equation:

$$F'_{new}(Y')=F(Y')(1-a)+F'_{old}(Y')(a).$$

In the described embodiment, when a frequency feature is calculated, $F'_{new}(Y')$ represents the average number of times the template with the highest closeness factor, Y', occurs in the general population of network users. The general population of network users includes all other users on the network. In another preferred embodiment, the general population can represent a specific subset of all network users. $F'_{new}(Y')$ is then used in a second equation along with $F(Y')$ to calculate a frequency feature for a particular template, which in the described embodiment is the template with the highest closeness factor for a particular user.

With respect to the first equation, two new variables, a and $F'_{old}(Y')$, are used along with $F(Y')$ to calculate $F'_{new}(Y')$. $F'_{old}(Y')$ is the value from the preceding time period T. It is essentially the $F'_{new}(Y')$ from the previous calculation using the equation. Since there is no $F'_{old}(Y')$ the first time the equation is used for a particular template and user, $F(Y')$ is used for $F'_{old}(Y')$ in the first pass. Thereafter, each $F'_{new}(Y')$ calculated becomes the $F'_{old}(Y')$ in the next calculation. The variable a can be referred to as a "smoothing" factor that allows the security program to assign different weights to $F'_{old}(Y')$ and $F(Y')$. In the described embodiment, $F(Y')$ represents the most recent average number of times the general population uses Y', and is given greater weight than the previous average, represented by $F'_{old}(Y')$. Thus, a may be approximately 0.1 or so, giving $F(Y')$ approximately 90% greater weight (since it is being multiplied by 1−a) and giving $F'_{old}(Y')$ approximately 10% weight in comparison. In the described embodiment, a may be between 0 and 1 and is preferably adjusted based on empirically derived data to fine tune the network intrusion detection system. This operation is generally referred to as smoothing. In another preferred embodiment, other mechanisms or adjustments can be used to fine tune the program by factoring in empirically derived information.

Once an $F'_{new}(Y')$ is calculated using the first equation, the frequency feature can be calculated using it, its standard deviation, and $F(Y')$. In the described embodiment, the following equation is used:

$$\text{frequency feature}=(F(Y')-F'_{new}(Y'))/STD(F'_{new}(Y')).$$

A standard deviation of the most recent average number of times Y' has been used by the general population is used to divide the difference between $F(Y')$ and $F'_{new}(Y')$. In another preferred embodiment, a running standard deviation can be used in place of the static standard deviation used in the equation above using techniques well known in the art. In the described embodiment, the frequency feature calculated is in one respect a running average of the number of times the template Y' occurs amongst all users in the general population.

Once the frequency feature is calculated at step 608, the program can calculate any other features for the security program at step 610. In the described embodiment, the frequency feature is one example of a feature that can be used in the present invention. In another preferred embodiment, the network intrusion program can be entirely frequency-based in which no other features are used to create input for the modeler described below. For example, in an all frequency-based program, the templates with the top five scores or closeness factors could be chosen instead of just the template with the highest score. Frequencies can be calculated for each one of the templates and used as the only input to the modeler. In either case, the feature building process is complete after step 610.

FIG. 7 is a flow diagram of a modeling process in accordance with the described embodiment of the present invention. It shows in greater detail a process implemented by modeler 24 of FIG. 2. As is well known in the field of computer science, there are many different modeling processes to choose from, such as linear regression or neural networks, to name just two. The actual modeling step is described below in step 706. Although any one of the numerous well known modeling techniques (e.g. Markov models, graphical models, regression models) can be used, whichever technique is used, the specific model used will be trained to evaluate the features to recognize the possibility of a network intrusion. This training can be done by providing the model frequency feature as defined above which is based on command and program name sequences known from previous experience to result in actual network intrusions. Other input to the modeling process include failed log-in time intervals (i.e., the time between failed log-in attempts) and other non-command related features. By training the modeler to recognize these sequences and the associated frequency features, it can recognize which sequences are intrusions and which are not.

At step 702, the modeling process accepts as input the frequency feature calculated in FIG. 6 or other features. In the described embodiment, one frequency feature is used as input, however in another preferred embodiment, multiple frequency features or other types of features described above can be used as input. At step 704, the frequency feature is combined with any other features based on the specific modeler. As is well known in the art, a modeler can accept different types of features. Once the modeler receives all input features, it calculates a score in step 706, which is distinct from the closeness factor calculated at step 508. This score is based upon the input features and the training the model has received.

At step 708 the security program uses the score derived in step 706 to determine whether an intrusion has occurred or has been attempted. The score derived by the modeler can be in the form of a real number or integer. In addition, it can be normalized to a number between 1 and 100 to facilitate evaluation by a human being. Once the modeler has determined whether an intrusion has occurred based on the score, the process is complete.

Figure 8:
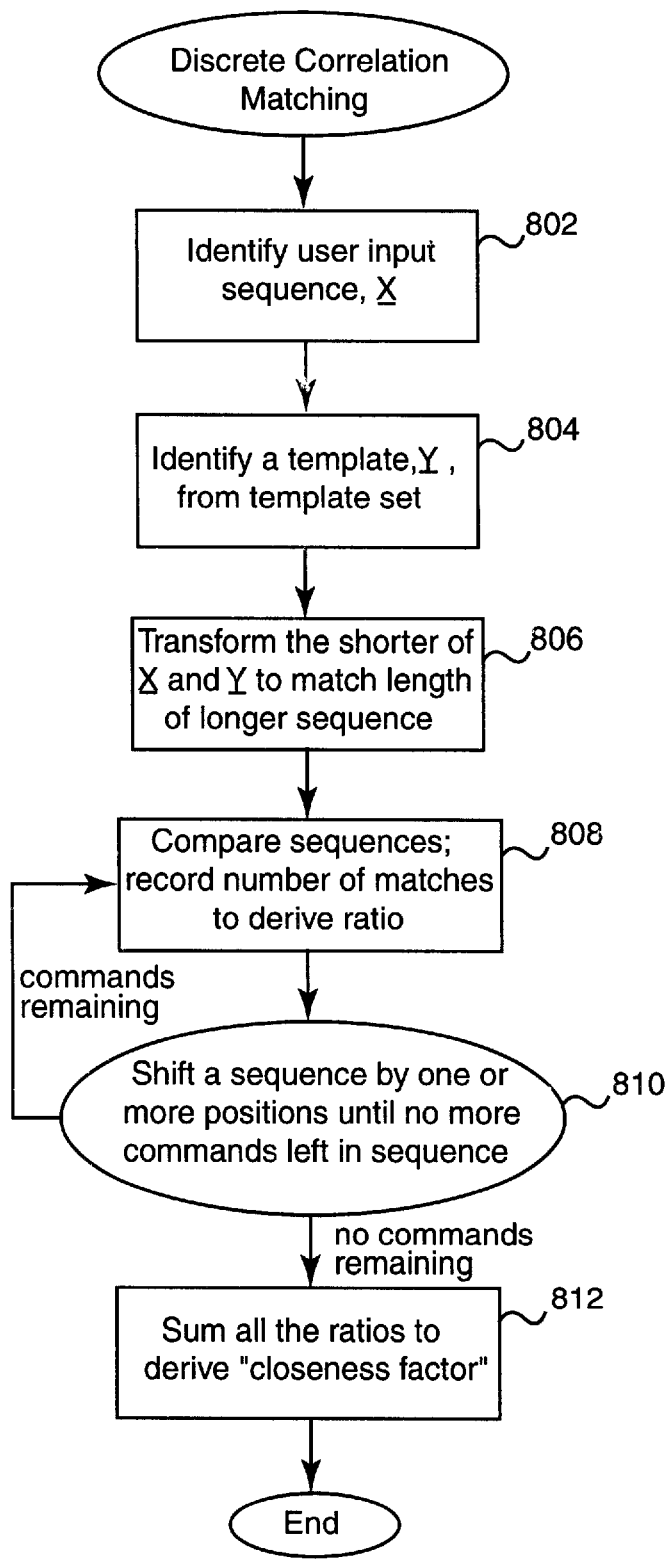
FIG. 8 is a flow diagram of a discrete correlation matching process that can be used in step 506 of FIG. 5 in accordance with the described embodiment of the present invention.
Figure 9:
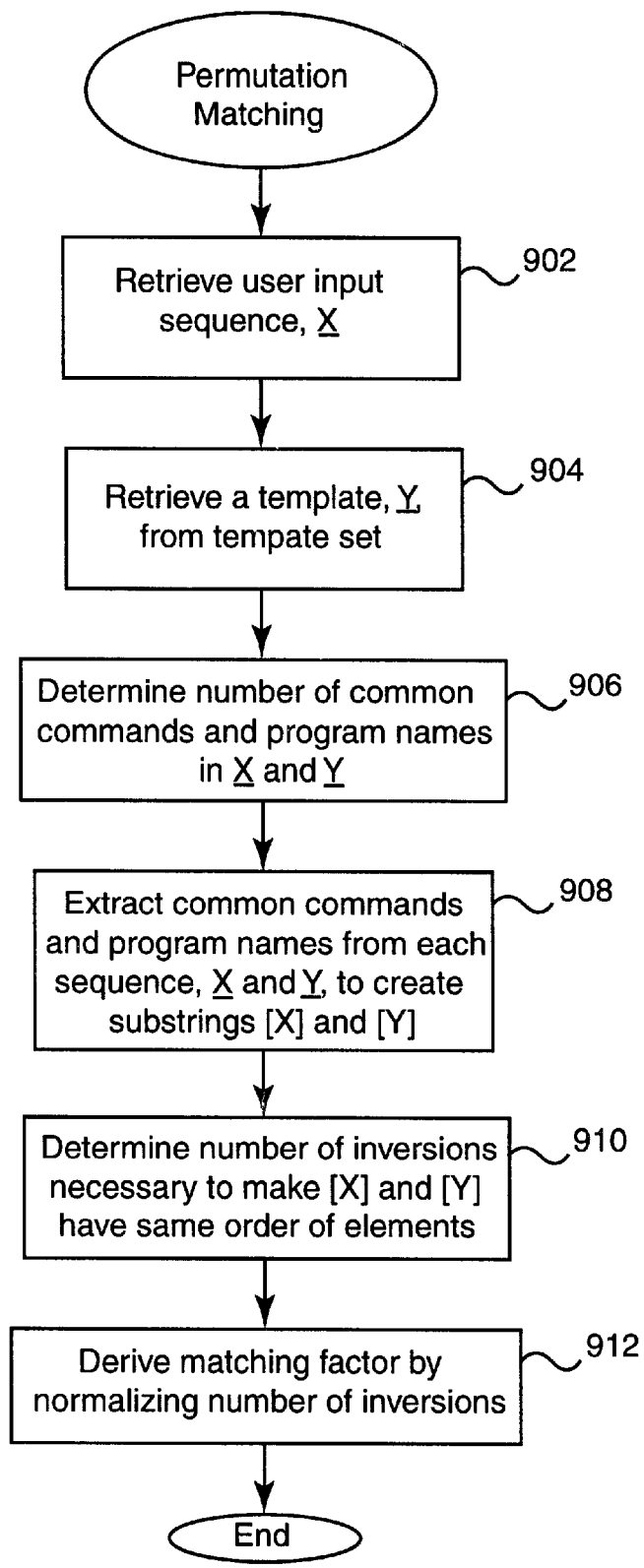
FIG. 9 is a flow diagram of a permutation matching process in accordance with the described embodiment of the present invention.

At step 506 of FIG. 5, a user input command sequence X and a sequence template Y are matched or compared. Two preferred techniques used to perform the match will now be described. FIG. 8 is a flow diagram of a "discrete correlation" matching process that can be used in step 506 of FIG. 5 in accordance with the described embodiment of the present invention. Another method, shown in FIG. 9, is referred to as "permutation matching."

At step 802 input sequence X retrieved in step 502 representing a string of command sequences and program names entered by a particular user in time period T is identified. At step 804 command sequence template Y, retrieved in step 504 is identified. Since the two sequences are not necessarily the same length, the shorter sequence is transformed before the actual comparison operation. In the described embodiment, this is done by padding the shorter sequence after the far right character with a reserved unique character which should not appear in either sequence (or in any possible command sequence) until the two sequences are the same length. This process is referred to as Padding (X, Y). In another preferred embodiment, other well known techniques can be used to transform either or both of the sequences to make them suitable for comparison.

Once the sequences have the same length, the first stage of the matching can be performed at step 808. Initially, each discrete command or program name in one sequence is compared to a corresponding command or program name in the other sequence. For example, if X=[a,b,c,d] and Y=[a, e,f,d], a is compared to a, b is compared to e, c is compared to f, and d is compared to d. The number of matches is recorded to derive a ratio. In this example, there are two matches: the a's and the d's, out of four comparisons. Thus, the ratio for this initial round of comparisons is 2/4, or 1/2.

At step 810, in the described embodiment, one of the sequences (it does not matter which one) is shifted by one position to the left or the right. Once one of the sequences is shifted by one position, control returns to step 808 and the same comparison operation is performed. Following the same example, after shifting Y one position to the right (or shifting X one position to the left), the b in X is compared to the a in Y, the c is compared to e, and the d is compared to the f in Y. The first a in X and the last d in Y are not compared to any other commands. Out of the three comparisons in the second round, there are no matches. Thus, the ratio from this round is 0/3, which is recorded by the security program. These ratios will be summed at step 812 described in more detail below. Control then returns to step 810 where one of the sequences is shifted again. For example, the Y sequence can be shifted once again to the right. The sequences are shifted until there are no more commands in either sequence to be compared. To complete the example, at step 808 the c in X is compared to the a in Y, and the d is compared to the e in Y. The ratio, in this case 0/2, is stored. The process is repeated one more time where d is compared to a providing the ratio 0/1.

In another preferred embodiment, one of the sequences can be shifted by two or more positions instead of just one. This can be done if the sequences are lengthy or for efficiency, although at the expense of accuracy in deriving the closeness factor. In another preferred embodiment, a closeness factor can be derived after performing the comparison with a one-position shift, as described above, and another closeness factor derived after performing the comparison with a two-position shift, and so on. After building a series of closeness factors using different position shifts, the best closeness factor is chosen. This can be done in numerous ways: taking the maximum, taking an average, taking the summation of all closeness factors, or taking the summation of the square values of all closeness factors, among other techniques.

At step 812, the ratios are summed to provide a closeness factor described initially in step 508 of FIG. 5. In the example above, the ratios 2/4, 0/3, 0/2, and 0/1 are summed giving a closeness factor of 1/2. This is the closeness factor between input sequence X and template Y. At this stage, the process of matching using the discrete correlation approach is complete.

FIG. 9 is a flow diagram of a permutation matching process in accordance with the described embodiment of the present invention. It shows another preferred method of matching two command sequences as initially shown in step 506 of FIG. 5. At step 902 input sequence X, retrieved at step 504, representing a string of command sequences and program names entered by a particular user for a predetermined duration of time is identified. At step 904 command sequence template Y is identified. In permutation matching, the X and Y sequences do not have to be the same length before performing the comparison, in contrast to the discrete correlation method.

At step 906 the security program determines the number of common commands and program names in the sequences X and Y. For example, if X=[a b c d e f] and Y=[d a b g c], the common elements are a, b, c, and d. At step 908 the common elements are extracted sequentially from each of the two sequences thereby creating two sub-groups: string X and string Y. Following the same example, string X=[a b c d] and string Y=[d a b c]. In the described embodiment, when there are duplicates of a common element in one of the sequences, the first occurrence of the duplicate (or multiple occurring) command or program name is extracted and placed in the string for that sequence. In another embodiment, the commands or program names are chosen randomly as long as there is one of each of the elements that are common. For example, if the number of common elements is four, as above, but X had multiple a's and d's, a random four elements are chosen from X until one of each of the common elements are extracted.

At step 910 the security program determines the number of adjacent-element inversions necessary to transform one of the strings to be identical to the other. Using the strings from above, the number of inversions necessary to transform string Y to be in the same order as string X is three. For example, where string X=[a b c d] and string Y=[d a b c], string Y after one inversion is [a d b c], after two inversions is [a b d c], and after three is [a b c d]. At step 912 the number of inversions is normalized to allow for a logical and accurate comparison of number of inversions for all templates Y. The inversion values have to be normalized since the length of the templates are not the same. Since the length of the templates are not the same, large differences in the number of inversions among templates based solely on their length can be caused and not necessarily be based on their closeness to the input sequence X. In the described embodiment, an inversion value is normalized by dividing the value by the number of inversions that would be needed to transform one sequence to another in the worst possible scenario; that is, if string Y, for example, is in complete reverse order from X. Following the same example, the total number of inversions necessary to transform string Y to string X if string Y is [d c b a] is six. Thus, the matching factor or score derived in step 912 for this example is 3/6. With permutation matching, the best matching factor is the one having the lowest number.

In the described embodiments, the closeness factor used to determine template Y' is derived using either the discrete correlation or the permutation matching method. In another embodiment, a template Y' can be determined from closeness factors derived from examining scores from a combination of both techniques. The following scenario illustrates this embodiment. Using discrete correlation, template A receives a score ranking it the highest, or most similar, to input sequence X and template B is ranked as the fifth most similar. In a second round of matching, this time using permutation matching, template A receives a score ranking it as third most similar to the same input sequence X and template B is ranked as first or the most similar to X. In this scenario, the security program still chooses Y' by determining the best score but examines how each of the highest ranking templates A and B ranked using the other matching technique. In this scenario, the program will choose template A since it is ranked third using the other matching method whereas template B ranked fifth using the other matching technique. Thus, template A ranked higher overall compared to template B. In another embodiment, the matching factor determined at step 912 (where the smaller the number the higher the similarity) is subtracted from one, and the security program chooses Y' from the template with the highest score derived from both matching techniques.

Computer System Embodiment

As described above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, matching, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a computer device, system or apparatus for performing the aforementioned operations. The system may be specially constructed for the required purposes, or it may be a general purpose computer, such as a server computer or a mainframe computer, selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
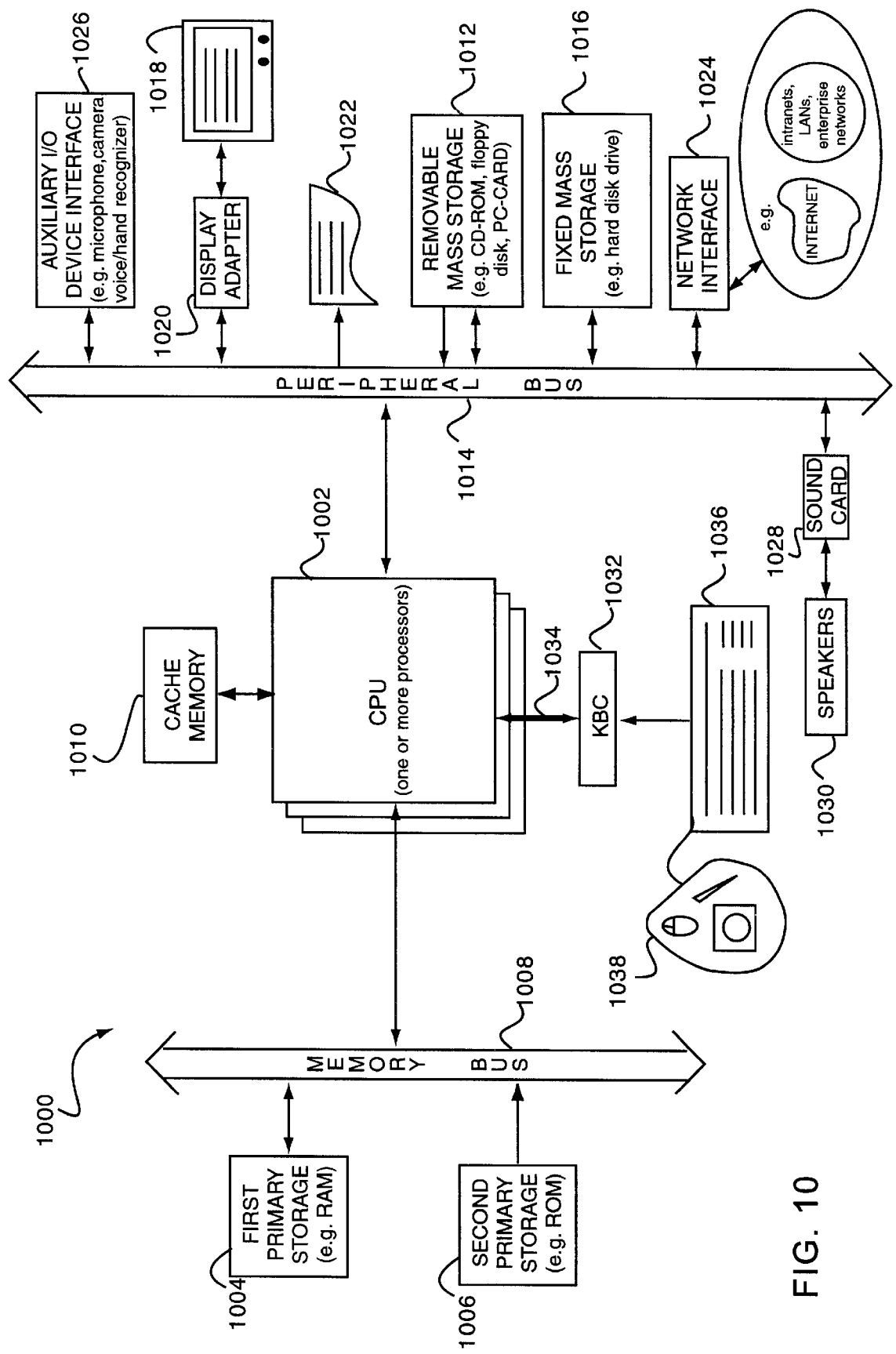
FIG. 10 is a block diagram of a typical computer system suitable for implementing an embodiment of the present invention.

FIG. 10 is a block diagram of a general purpose computer system 1000 suitable for carrying out the processing in accordance with one embodiment of the present invention. FIG. 10 illustrates one embodiment of a general purpose computer system that, as mentioned above, can be a server computer, a client computer, or a mainframe computer. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data, such as command and program name sequences. It can also store programming instructions and data, in the form of a message store in addition to other data and instructions for processes operating on CPU 1002, and is used typically used for fast transfer of data and instructions in a bi-directional manner over the memory bus 1008. Also as well known in the art, primary storage 1006 typically includes basic operating instructions, program code, data, and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, smart cards, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, including the Internet or an intranet, or telecommunications network using a network connection as shown. Through the network interface 1024, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data that can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, a single matching technique or a combination of both matching techniques can be used to determine the closest template. In another example, the discrete correlation matching can use varying gaps between matches depending on levels of accuracy and efficiency desired. In yet another example, in determining the frequency feature, a running average or a running standard deviation can be used in place of the averages shown in the described embodiment. Accordingly, the present embodiments are to be considered as illustrative and not restrictive, and the invention is not to be limited to the details given herein, but may be modified within the scope and equivalents of the appended claims.

What is claimed is:

1. A method of detecting an intrusion in a computer network, the method comprising:

(a) retrieving a user input sequence;

(b) retrieving a sequence template from a plurality of sequence templates;

(c) comparing the user input sequence and the sequence template to derive a closeness factor indicating a degree of similarity between the user input sequence and the sequence template;

(d) calculating a frequency feature associated with the user input sequence and a most similar sequence template; and (e) determining whether the user input sequence is a potential intrusion by examining output from a modeler using the frequency feature as one input to the modeler.

2. A method as recited in claim 1 further comprising:

retrieving the most similar sequence template;

determining a first frequency of how often the user input sequence occurs in a first command stream created by a particular network user from a plurality of network users;

determining a second frequency of how often the most similar sequence template occurs in a second command stream created by the plurality of network users; and calculating the frequency feature using the first frequency and the second frequency.

3. A method as recited in claim 2 further comprising calculating the second frequency using a smoothing coefficient and a previous second frequency.

4. A method as recited in claim 1 wherein retrieving a user input sequence further comprises:

logging, in a chronological manner, commands and program names entered in the computer network thereby creating a command log;

arranging the command log according to individual users on the computer network; and identifying the user input sequence from the command log using a predetermined time period.

5. A method as recited in claim 1 wherein retrieving a sequence template from a plurality of sequence templates further comprises:

logging chronologically commands and program names entered in the computer network thereby creating a command log;

identifying a command sequence from the command log determined to be suspicious; and creating the sequence template from the command sequence.

6. A method as recited in claim 1 further comprising:

repeating steps (b) through (c) for each sequence template in the plurality of sequence templates thereby deriving a plurality of closeness factors; and determining the most similar sequence template by examining each closeness factor from the plurality of closeness factors.

7. A method as recited in claim 1 wherein comparing the user input sequence and the sequence template to derive a closeness factor further comprises utilizing permutation matching to compare the user input sequence and one sequence template from the plurality of sequence templates.

8. A method as recited in claim 1 wherein comparing the user input sequence and the sequence template to derive a closeness factor further comprises utilizing discrete correlation matching to compare the user input sequence template and one sequence template from the plurality of sequence templates.

9. A method of determining similarity between a user sequence and a sequence template in a computer network intrusion detection system using correlation matching, the method comprising:

(a) retrieving the user sequence including a plurality of user commands;

(b) retrieving a template sequence including a plurality of template commands;

(c) transforming one of the user sequence and the template sequence such that the user sequence and the template sequence are of substantially the same length;

(d) performing a series of comparisons between the user sequence and the template sequence producing matches;

(e) deriving a similarity factor from the number of matches between the plurality of user commands and the plurality of template commands; and (f) associating the similarity factor with said template sequence as an indication of likelihood of intrusion, whereby the complexity of the computer network intrusion system is low.

10. A method as recited in claim 9 wherein transforming one of the user sequence and the template sequence further comprises:

determining which of the user sequence and the template sequence is a shorter sequence; and inserting one or more reserved characters at the end of the shorter sequence.

11. A method as recited in claim 9 wherein deriving a similarity factor from the number of matches further comprises shifting one of the plurality of user command elements and the plurality of template command elements by one or more elements before performing each comparison of the series of comparisons between the user sequence and the template sequence.

12. A method of determining similarity between a user sequence and a template sequence in a computer network intrusion system using permutation matching, the method comprising:

retrieving the user sequence including a plurality of user commands;

retrieving a template sequence including a plurality of stored commands;

creating a user subset and a template subset, the user subset including user commands found in the template sequence and the template subset including stored commands found in the user sequence; and determining a number of alterations needed to reorder one of the user subset and the template subset to have the same order as one of the user subset and the template subset that was not reordered wherein the number of alterations is indicative of similarity between the user sequence and the template sequence, the similarity indicating a likelihood of intrusion, whereby the complexity of the computer network intrusion is low.

13. A method as recited in claim 12 further comprising inverting adjacent user commands of the user subset until the order of the user commands is the same as the order of the stored commands of template subset.

14. A method as recited in claim 12 further comprising inverting adjacent stored commands of the template subset until the order of the stored commands is the same as the order of the user commands of the user subset.

15. A method as recited in claim 12 further comprising normalizing the number of alterations by dividing the number of alterations by a worst-case number of alterations wherein the worst-case number of alterations is the number of alterations needed to reorder one of the user subset and the template subset to have the same order as one of the user subset and the template subset that was not reordered when the user commands in the user subset and the stored commands in the template subset are in opposite order.

16. A system for detecting an intrusion in a computer network, the system comprising:

an input sequence extractor for retrieving a user input sequence;

a sequence template extractor for retrieving a sequence template from a plurality of sequence templates;

a match component for comparing the user input sequence and the sequence template to derive a closeness factor indicating a degree of similarity between the user input sequence and the sequence template;

a features builder for calculating a frequency feature associated with the user input sequence and a most similar sequence template; and a modeler using the frequency feature as one input to the modeler whereby it can be determined whether the user input sequence is a potential intrusion by examining output from the modeler.

17. A system as recited in claim 16 wherein the user input extractor further comprises:

a command log containing, in a chronological manner, commands and program names entered in the computer network and arranged according to individual users on the computer network; and a sequence identifier for identifying the user input sequence from the command log using a predetermined time period.

18. A system as recited in claim 16 wherein the sequence template extractor further comprises:

a command log containing, in a chronological manner, commands and program names entered in the computer network;

a command sequence identifier for identifying a command sequence from the command log determined to be suspicious; and a sequence template extractor for creating the sequence template from the command sequence.

19. A system as recited in claim 16 wherein the match component for comparing the user input sequence and the sequence template further comprises a permutation matching component for comparing the user input sequence and one sequence template from the plurality of sequence templates.

20. A system as recited in claim 16 wherein the match component for comparing the user input sequence and the sequence template further comprises a correlation matching component to compare the user input sequence template and one sequence template from the plurality of sequence templates.

21. A computer-readable medium containing programmed instructions arranged to detect an intrusion in a computer network, the computer-readable medium including programmed instructions for:

(a) retrieving a user input sequence;

(b) retrieving a sequence template from a plurality of sequence templates;

(c) comparing the user input sequence and the sequence template to derive a closeness factor indicating a degree of similarity between the user input sequence and the sequence template;

(d) calculating a frequency feature associated with the user input sequence and a most similar sequence template; and (e) determining whether the user input sequence is a potential intrusion by examining output from a modeler using the frequency feature as one input to the modeler.

22. A computer-readable medium as recited in claim 21 further comprising programmed instructions for:

retrieving the most similar sequence template; determining a first frequency of how often the user input sequence occurs in a first command stream created by a particular network user from a plurality of network users;

determining a second frequency of how often the most similar sequence template occurs in a second command stream created by the plurality of network users; and calculating the frequency feature using the first frequency and the second frequency.

23. A computer-readable medium as recited in claim 22 further comprising programmed instructions for calculating the second frequency using a smoothing coefficient and a previous second frequency.

24. A computer-readable medium as recited in claim 21 wherein the programmed instructions for retrieving a user input sequence further comprises programmed instructions for:

logging, in a chronological manner, commands and program names entered in the computer network to create a command log;

arranging the command log according to individual users on the computer network; and identifying the user input sequence from the command log using a predetermined time period.

25. A computer-readable medium as recited in claim 21 wherein the programmed instructions for retrieving a sequence template from a plurality of sequence templates further comprises programmed instructions for:

logging chronologically commands and program names entered in the computer network thereby creating a command log;

identifying a command sequence from the command log determined to be suspicious; and creating the sequence template from the command sequence.

26. A computer-readable medium as recited in claim 21 further comprising programmed instructions for:

repeating steps (b) through (c) for each sequence template in the plurality of sequence templates to derive a plurality of closeness factors; and determining the most similar sequence template by examining each closeness factor from the plurality of closeness factors.

27. A computer-readable medium as recited in claim 21 wherein the programmed instructions for comparing the user input sequence and the sequence template to derive a closeness factor further comprises programmed instructions for utilizing permutation matching to compare the user input sequence and one sequence template from the plurality of sequence templates.

28. A computer-readable medium as recited in claim 21 wherein programmed instructions for comparing the user input sequence and the sequence template to derive a closeness factor further comprises programmed instructions for utilizing discrete correlation matching to compare the user input sequence template and one sequence template from the plurality of sequence templates.

29. A computer-readable medium containing programmed instructions arranged to determine similarity between a user sequence and a sequence template in a computer network intrusion detection system using correlation matching, the computer-readable medium including programmed instructions for:

(a) retrieving the user sequence including a plurality of user commands;

(b) retrieving a template sequence including a plurality of template commands;

(c) transforming one of the user sequence and the template sequence such that the user sequence and the template sequence are of substantially the same length;

(d) performing a series of comparisons between the user sequence and the template sequence producing matches;

(e) deriving a similarity factor from the number of matches between the plurality of user commands and the plurality of template commands; and (f) associating the similarity factor with said template sequence as an indication of likelihood of intrusion, whereby the complexity of the computer network intrusion system is low.

30. A computer-readable medium containing programmed instructions arranged to determine similarity between a user sequence and a template sequence in a computer network intrusion system using permutation matching, the computer-readable medium including programmed instructions for:

retrieving the user sequence including a plurality of user commands; retrieving a template sequence including a plurality of stored commands;

creating a user subset and a template subset, the user subset including user commands found in the template sequence and the template subset including stored commands found in the user sequence; and determining a number of alterations needed to reorder one of the user subset and the template subset to have the same order as one of the user subset and the template subset that was not reordered wherein the number of alterations is indicative of similarity between the user sequence and the template sequence, the similarity indicating a likelihood of intrusion, whereby the complexity of the computer network intrusion is low.

* * * * *